United States Patent
Chalmers et al.

(10) Patent No.: US 8,839,048 B2
(45) Date of Patent: *Sep. 16, 2014

(54) METHOD FOR RANKING ANALYSIS TOOLS

(75) Inventors: Diane C Chalmers, Rochester, MN (US); Nixon Cheaz, Cary, NC (US); James Y McVea, Jr., Chapel Hill, NC (US); David M Stecher, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 249 days.

This patent is subject to a terminal disclaimer.

(21) Appl. No.: 13/413,993

(22) Filed: Mar. 7, 2012

(65) Prior Publication Data

US 2013/0238940 A1 Sep. 12, 2013

(51) Int. Cl.
*G06F 11/00* (2006.01)
(52) U.S. Cl.
USPC .............................. 714/47.3; 714/37
(58) Field of Classification Search
USPC .......................................... 714/47.3
See application file for complete search history.

(56) References Cited

U.S. PATENT DOCUMENTS

| | | | |
|---|---|---|---|
| 6,298,454 B1* | 10/2001 | Schleiss et al. | 714/37 |
| 6,789,251 B1* | 9/2004 | Johnson | 717/100 |
| 7,194,445 B2* | 3/2007 | Chan et al. | 706/20 |
| 7,305,465 B2* | 12/2007 | Wing et al. | 709/223 |
| 7,739,126 B1 | 6/2010 | Cave et al. | |
| 7,739,666 B2* | 6/2010 | Zhu et al. | 717/127 |
| 8,151,146 B2* | 4/2012 | Ostrand et al. | 714/47.1 |
| 2004/0025082 A1* | 2/2004 | Roddy et al. | 714/25 |
| 2008/0091384 A1* | 4/2008 | Subramanian et al. | 702/185 |
| 2008/0147789 A1* | 6/2008 | Wing et al. | 709/203 |
| 2008/0155564 A1* | 6/2008 | Shcherbina et al. | 719/318 |
| 2009/0235232 A1* | 9/2009 | Malik et al. | 717/120 |
| 2009/0313605 A1* | 12/2009 | Ostrand et al. | 717/124 |
| 2011/0282886 A1 | 11/2011 | O'Donnell et al. | |
| 2012/0131573 A1* | 5/2012 | Dasari et al. | 718/1 |

OTHER PUBLICATIONS

"Analysis of algorithms"; Wikipedia; http://en.wikipedia.org/wiki/Analysis_of_algorithms; Nov. 26, 2011.
"Recommender system"; Wikipedia; http://en.wikipedia.org/wiki/Recommender_system; Nov. 26, 2011.

* cited by examiner

*Primary Examiner* — Kamini Patel
(74) *Attorney, Agent, or Firm* — North Shore Patents, P.C.; Michele Liu Baillie

(57) ABSTRACT

Analysis tools are used for resolving a service request for software performance problems. Ranking of the analysis tools includes measuring a plurality of times to resolution of a plurality of service requests for software performance problems after runnings of a plurality of analysis tools are initiated; capturing sets of errors in the plurality of service requests; storing identities of the plurality of analysis tools with the times to resolution of the service requests and the sets of errors; determining an average time to resolution of each of the plurality of analysis tools for each set of errors; organizing the plurality of analysis tools into one or more categories using the sets of errors; and ranking the analysis tools within each category using the average times to resolution of the analysis tools within the category.

13 Claims, 4 Drawing Sheets

METHOD FOR RANKING ANALYSIS TOOLS

BACKGROUND

Customers of software products often contact vendor support personnel when software problems occur. For example, as part of the support process, a customer may electronically submit a service request to support personnel. The service request includes a collection of files that contain the errors at issue. When a support person begins working on a service request, she must choose from a variety of different analysis tools to run on the service request files. Selecting the most appropriate or efficient analysis tool for a particular error or sets of errors can sometimes be difficult. Support personnel often rely upon their own experience or the recommendation of those with more technical expertise. Some attempt to highlight certain analysis tools by ranking the analysis tools by popularity or alphabetically. However, these approaches do not necessarily highlight the most appropriate or efficient analysis tools for the customer's specific problem.

SUMMARY

According to one embodiment of the present invention, in a method for ranking analysis tools by a computing system, a processor of the computing system measures a time to resolution of a given software performance problem for each run of any of a plurality of analysis tools. The processor determines an average time to resolution of the given software performance problem for each of the plurality of analysis tools and ranks the plurality of analysis tools using the average times to resolution of the given software performance problems for the plurality of analysis tools.

In one aspect of the present invention, measuring the time to resolution of the given software performance problem for each run of any of the plurality of analysis tools comprises receiving a service request for the software performance problem, wherein the service request includes one or more files, and includes initiating a running of a given analysis tool of the plurality of analysis tools. A time to resolution of the service request is measured from a predetermined time after the given analysis tool was initiated. A set of errors in the files of the service request is captured and an identity of the given analysis tool is stored along with the time to resolution of the service request and the set of errors.

In one aspect of the present invention, determining the average time to resolution of the given software performance problem for each of the plurality of analysis tools comprises aggregating the stored identity of the given analysis tool with the time to resolution of the service request and the set of errors across a plurality of service requests and determining an average time to resolution of each of the plurality of analysis tools for each set of errors.

In one aspect of the present invention, the ranking the plurality of analysis tools using the average times to resolution of the given software performance problems for the plurality of analysis tools comprises organizing the plurality of analysis tools into one or more categories using the sets of errors aggregated across the plurality of service requests. Analysis tools are ranked within each category using the average times to resolution of the analysis tools within the category.

In one aspect of the present invention, receiving a second service request for a second software performance problem, wherein the second request includes one or more files. A second set of errors is captured in the one or more second service request files and a given category of analysis tools is determined using the second set of errors. One or more analysis tools in the given category is recommended based on the rankings of the analysis tools within the given category.

System and computer program products corresponding to the above-summarized methods are also described and claimed herein.

DETAILED DESCRIPTION

Figure 1:
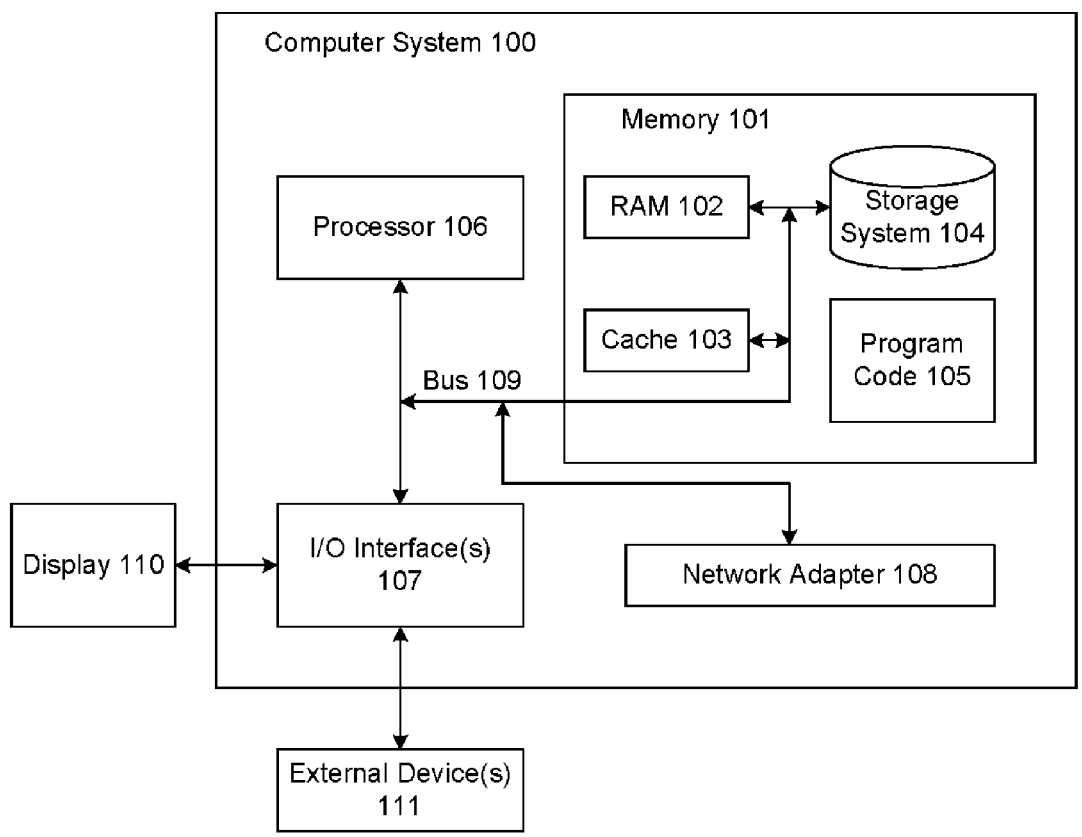
FIG. 1 illustrates an embodiment of a system for ranking analysis tools according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for ranking analysis tools according to the present invention. The computer system 100 is operationally coupled to a processor or processing units 106, a memory 101, and a bus 109 that couples various system components, including the memory 101 to the processor 106. The bus 109 represents one or more of any of several types of bus structures, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may also communicate with one or more external devices 111, such as a display 24, via I/O interfaces 107. The computer system 100 may communicate with one or more networks via network adapter 108.

Figure 2:
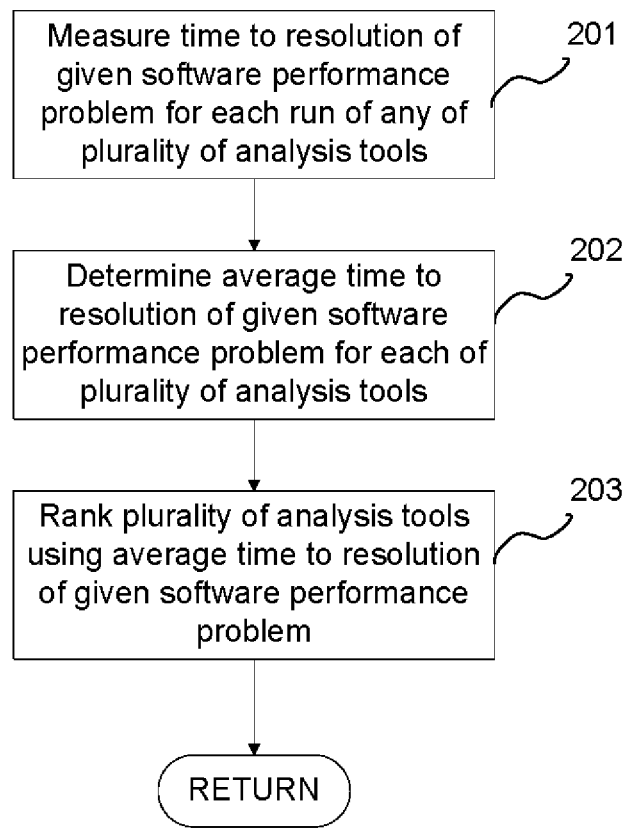
FIG. 2 is a flowchart illustrating an embodiment of a method for ranking analysis tools according to the present invention.

FIG. 2 is a flowchart illustrating an embodiment of a method performed by a circuit, module or system for ranking analysis tools according to the present invention. The method measures the time to resolution of a given software performance problem for each run of any of a plurality of analysis tool available to a support person (201). Using this data, the method determines an average time to resolution of the given performance problem for each of the plurality of analysis tools (202). The method then ranks the plurality of analysis tools using the average times to resolution of the given software performance problem (203). Recommendations of analysis tools may be made to support personnel for resolving the given software performance problem based on the rankings. In this manner, the embodiments of the present invention assist in the selection of the most appropriate or efficient analysis tools for resolving particular software problems.

Figure 3:
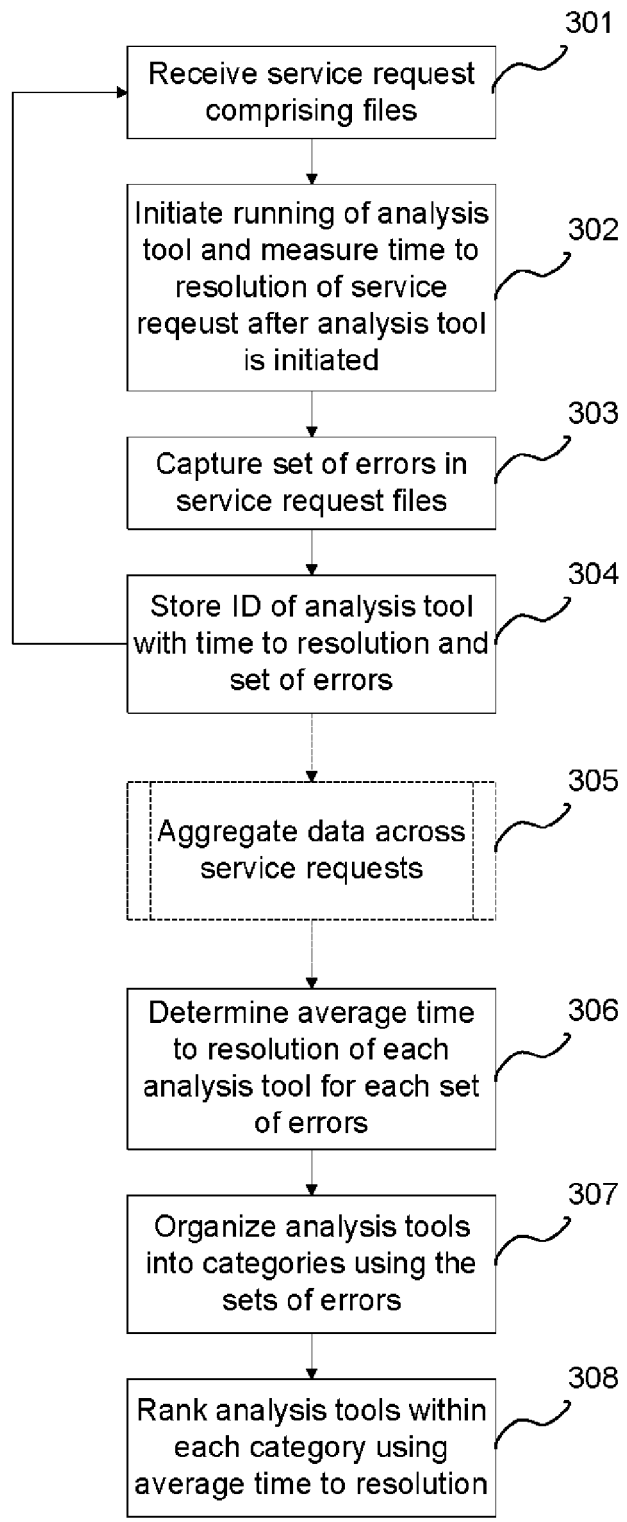
FIG. 3 is a flowchart illustrating in further detail the embodiment of the method for ranking analysis tools according to the present invention.

FIG. 3 is a flowchart illustrating in further detail the embodiment of the method for ranking analysis tools according to the present invention. Customers submit service requests to support personnel for assistance with a software performance problem. The service request contains files, such as emails, system logs, etc. Contained within the service request files are errors that may identity the problems, i.e., serve as "fingerprints" or "symptoms" of the problem. In response to receiving a service request comprising the files from a customer (301), the circuit, module or system receives a signal from the support person initiating the running of an analysis tool of a plurality of analysis tools, and the method measures the time to resolution of the service request from a predetermined time after the analysis tool is initiated (302). For example, when the analysis tool is initiated, the method starts a timer for the service request. The timer will run until the service request is resolved. Further, the method examines the service request files and captures a set of errors in the service request files (303). The method then stores the identity of the analysis tool that was run along with the time to resolution and the set of errors (304). Steps 301 through 304 are repeated each time an analysis tool is run.

The method aggregates the data collected across multiple service requests (305), and uses the aggregated data to determine the average time to resolution of each analysis tool for each set of errors (306). The method further uses the aggregated data to organize the analysis tools into categories using the sets of errors (307). For example, when a memory analyzer tool and a heap analyzer tool are most often run on the service requests containing files with Out of Memory exceptions and Null Pointer Exceptions, then the method can place the memory analyzer and heap analyzer tools into the category for Out of Memory and Null Pointer Exceptions. The analysis tools within each category are then ranked using their respective average times to resolutions (308). For example, when the average time to resolution for the memory analyzer tool is one hour and the average time to resolution for the heap analyzer tool is two hours, the method can rank the memory analyzer tool higher than the heap analyzer tool.

Figure 4:
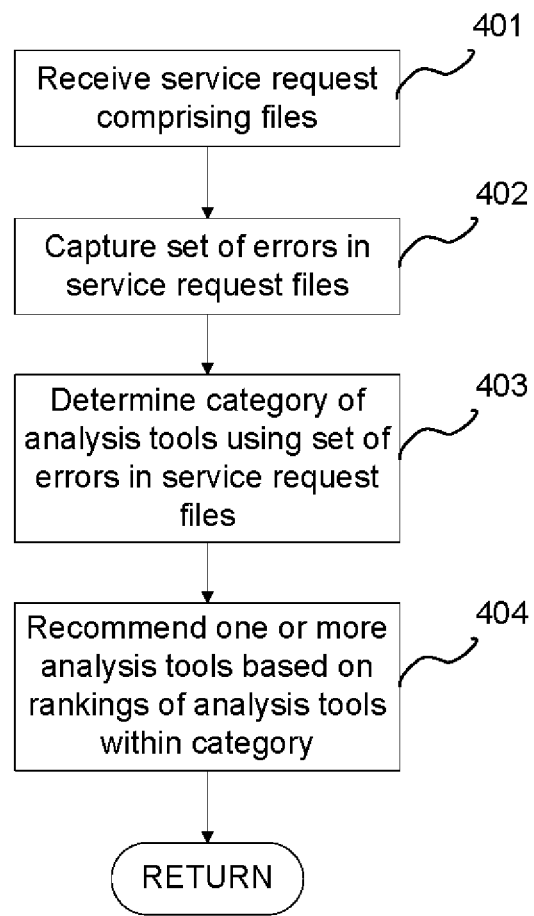
FIG. 4 is a flowchart illustrating an embodiment of a method for recommending analysis tools according to the present invention.

The rankings may then be used to provide recommendations of which analysis tools for use with which sets of errors. FIG. 4 is a flowchart illustrating an embodiment of a method for recommending analysis tools according to the present invention. When a support person receives a service request comprising files from a customer (401), the method captures the set of errors found in the service request files (402). The method then determines the category of analysis tools using the set of errors (403). The method then can recommend one or more analysis tools based on their rankings within that category (404). For example, assume that the service request files from the customer contain Out of Memory and Null Pointer Exceptions. The method captures these errors for the service request files and determines that they are relevant to the Out of Memory and Null Pointer Exceptions category. The method can then recommend the memory analyzer tool over the heap analyzer tool since the memory analyzer tool is ranked higher than the heap analyzer tool in this category.

Considerations other than or in addition to the average time to resolution may be used to rank the analysis tools. For example, the number of clicks that occur in a service request after an analysis tool is run can be recorded. This information may indicate the amount of interaction that an analysis tool may require after it is initially invoked to resolve a service request. Other possible considerations may include: time that the analysis tool is displayed in foreground or the background, which may indicate the amount of actual interaction with the analysis tool by the support person; or the amount of email communications between the support person and the customer after an analysis tool is initiated, which may indicate the level of complexity of the problem. These considerations may be used to increase the accuracy of the rankings and thus the recommendations based on the rankings.

Further, embodiments of the method may recommend a chain of analysis tools to use for a particular set of errors. When a first recommended analysis tool does not resolve the service request, the method may recommend the next higher ranking analysis tool, and so forth. The embodiments of the method may further recommend particular combinations of analysis tools to use for a particular set of errors, where the combination is determined to lead to faster time to resolution.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for ranking analysis tools, the computer program product comprising:
    a computer readable memory device having computer readable program code embodied therewith, the computer readable program code configured to:
    measure a time to resolution of a given software performance problem for each run of any of a plurality of analysis tools, further configured to:
        receive a service request for the software performance problem, wherein the service request includes one or more files;
        initiate a running of a given analysis tool of the plurality of analysis tools;
        measure a time to resolution of the service request from a predetermined time after the given analysis tool is initiated;
        capture a set of errors in the one or more files of the service request; and
        store an identity of the given analysis tool with the time to resolution of the service request and the set of errors;
    determine an average time to resolution of the given software performance problem for each of the plurality of analysis tools; and
    rank the plurality of analysis tools using the average times to resolution of the given software performance problems for the plurality of analysis tools.

2. The computer program product of claim 1, wherein the computer readable program code configured to determine the average time to resolution of the given software performance problem for each of the plurality of analysis tools is further configured to:
    aggregate the stored identity of the given analysis tool with the time to resolution of the service request and the set of errors across a plurality of service requests; and determining an average time to resolution of each of the plurality of analysis tools for each set of errors.

3. The computer program product of claim 2, wherein the computer readable program code configured to rank the plurality of analysis tools using the average times to resolution of the given software performance problems for the plurality of analysis tools is further configured to:
organize the plurality of analysis tools into one or more categories using the sets of errors aggregated across the plurality of service requests; and
rank analysis tools within each category using the average times to resolution of the analysis tools within the category.

4. The computer program product of claim 3, wherein the computer readable program code is further configured to:
receive a second service request for a second software performance problem, wherein the second service request includes one or more files;
capture a second set of errors in the second service request files;
determine a given category of analysis tools using the second set of errors; and
recommend one or more analysis tools in the given category based on the rankings of the analysis tools within the given category.

5. A system, comprising:
a processor; and
a computer readable memory device, having computer readable program code embodied therewith, the computer readable program code configured to:
measure a time to resolution of a given software performance problem for each run of any of a plurality of analysis tools, further configured to:
receive a service request for the software performance problem, wherein the service request includes one or more files;
initiate a running of a given analysis tool of the plurality of analysis tools;
measure a time to resolution of the service request from a predetermined time after the given analysis tool is initiated;
capture a set of errors in the one or more files of the service request; and
store an identity of the given analysis tool with the time to resolution of the service request and the set of errors;
determine an average time to resolution of the given software performance problem for each of the plurality of analysis tools; and
rank the plurality of analysis tools using the average times to resolution of the given software performance problems for the plurality of analysis tools.

6. The system of claim 5, wherein the computer readable program code configured to determine the average time to resolution of the given software performance problem for each of the plurality of analysis tools is further configured to:
aggregate the stored identity of the given analysis tool with the time to resolution of the service request and the set of errors across a plurality of service requests; and
determining an average time to resolution of each of the plurality of analysis tools for each set of errors.

7. The system of claim 6, wherein the computer readable program code configured to rank the plurality of analysis tools using the average times to resolution of the given software performance problems for the plurality of analysis tools is further configured to:
organize the plurality of analysis tools into one or more categories using the sets of errors aggregated across the plurality of service requests; and
rank analysis tools within each category using the average times to resolution of the analysis tools within the category.

8. The system of claim 7, wherein the computer readable program code is further configured to:
receive a second service request for a second software performance problem, wherein the second service request includes one or more files;
capture a second set of errors in the second service request files;
determine a given category of analysis tools using the second set of errors; and
recommend one or more analysis tools in the given category based on the rankings of the analysis tools within the given category.

9. A method for ranking analysis tools by a computing system comprising a processor, comprising:
measuring by the processor a time to resolution of a given software performance problem for each run of any of a plurality of analysis tools, further comprising:
receiving a service request for the software performance problem, wherein the service request includes one or more files;
initiating a running of a given analysis tool of the plurality of analysis tools;
measuring a time to resolution of the service request from a predetermined time after the given analysis tool is initiated;
capturing a set of errors in the one or more files of the service request; and
storing an identity of the given analysis tool with the time to resolution of the service request and the set of errors;
determining, by the processor, an average time to resolution of the given software performance problem for each of the plurality of analysis tools; and
ranking, by the processor, the plurality of analysis tools using the average times to resolution of the given software performance problems for the plurality of analysis tools.

10. The method of claim 9, wherein the determining the average time to resolution of the given software performance problem for each of the plurality of analysis tools comprises:
aggregating the stored identity of the given analysis tool with the time to resolution of the service request and the set of errors across a plurality of service requests; and
determining an average time to resolution of each of the plurality of analysis tools for each set of errors.

11. The method of claim 10, wherein the ranking the plurality of analysis tools using the average times to resolution of the given software performance problems for the plurality of analysis tools comprises:
organizing the plurality of analysis tools into one or more categories using the sets of errors aggregated across the plurality of service requests; and
ranking analysis tools within each category using the average times to resolution of the analysis tools within the category.

12. The method of claim 11, further comprising:
receiving a second service request for a second software performance problem, wherein the second service request includes one or more files;
capturing a second set of errors in the second service request files;

determining a given category of analysis tools using the second set of errors; and recommending one or more analysis tools in the given category based on the rankings of the analysis tools within the given category.

13. A method for ranking analysis tools by a computing system comprising a processor, comprising:

measuring, by the processor, a plurality of times to resolution of a plurality of service requests for software performance problems after runnings of a plurality of analysis tools are initiated;

capturing, by the processor, sets of errors in the plurality of service requests;

storing, by the processor, identities of the plurality of analysis tools with the times to resolution of the service requests and the sets of errors;

determining, by the processor, an average time to resolution of each of the plurality of analysis tools for each set of errors;

organizing, by the processor, the plurality of analysis tools into one or more categories using the sets of errors;

ranking, by the processor, the analysis tools within each category using the average times to resolution of the analysis tools within the category receiving a given service request for a given software performance problem, wherein the given service request includes one or more files;

capturing a given set of errors in the given service request files;

determining a given category of analysis tools using the given set of errors; and recommending one or more analysis tools in the given category based on the rankings of the analysis tools within the given category.

* * * * *